United States Patent Office 3,532,644
Patented Oct. 6, 1970

3,532,644
ULTRA HIGH MOLECULAR WEIGHT OXIRANE POLYMERS BY POLYMERIZATION WITH ORGANOMETALLIC CATALYSTS MODIFIED BY NITRO COMPOUNDS
Franklin E. Mange, Rudolf S. Buriks, and Allen R. Fauke, St. Louis, Mo., assignors to Petrolite Corporation, Wilmington, Del., a corporation of Delaware
No Drawing. Filed July 24, 1967, Ser. No. 655,355
Int. Cl. C08g 23/06
U.S. Cl. 260—2                                    8 Claims

ABSTRACT OF THE DISCLOSURE

A catalyst system comprising (1) a catalyst capable of producing ultra-high molecular weight oxirane polymers as illustrated by organometallic catalysts such as of the organo-aluminum type and (2) a nitro compound as illustrated by a nitro-aromatic compound; processes for preparing oxirane polymers employing said catalyst system; relatively monodisperse oxirane polymers produced by said processes, having lower viscosities in solution; uses for said oxirane polymers, particularly in demulsification, such uses being facilitated by lower viscosities of polymer solutions.

In application S.N. 570,753 filed Aug. 8, 1966, now U.S. Pat. No. 3,499,847, there are described and claimed ultra-high molecular weight polymers, processes by which they are prepared and uses therefor, particularly relating to ultra-high molecular weight polymers of alkylene oxides, i.e., oxirane polymers, and uses therefor.

In the preparation of ultra-high molecular weight poly-alkylene-oxides, it is not only desirable to control the average molecular weight but also the molecular weight distribution of the product. Stated another way, it is highly desirable to have the molecular weight of each polymeric species as close as possible to the average molecular weight, i.e., monodisperse.

We have now discovered a process for controlling both the molecular weight and the molecular weight distribution of polyalkylene oxides, which is characterized by employing a nitro compound in the polymerization system. The presence of even trace amounts of nitro and especially nitro-aromatic compounds not only controls the average molecular weight of the polymer but also produces a more monodisperse polymer.

Organoaluminum compounds when reacted with water and a chelating agent are excellent catalysts for the homo- and copolymerization of oxiranes as described in U.S. Pat. 3,135,705. Because of the excellence of this polymerization reaction, the process frequently takes place with the production of very high molecular weight polymers, which in some cases are too high for particular uses. Solution polymerizations are often desirable, but may yield a solution of the product having a much higher viscosity than needed. This situation may be avoided by selecting a less active catalyst system, for example, by lowering the amount of the chelating agent such as acetyl acetone as described in application S.N. 570,753, or by carrying out the polymerization in the presence of a carbonium ion as described in U.S. Pat. 3,313,743. Although both of these methods tend to yield polymers of lower molecular weights, they also yield products having extremely broad molecular weight distributions.

In accordance with this invention, it has now been found that the average molecular weight of the polymer can not only be lowered by carrying out the polymerization by using certain highly active metal-organo catalyst systems which are modified in accord with the present invention by the incorporation of certain nitro compounds, preferably nitro-aromatics, but that the products are also mono-disperse, or stated another way, that by the use of these new catalyst systems, it is possible to prepare polymers having not only a lower average molecular weight but also a narrower molecular weight distribution as compared to those polymers produced by the processes of S.N. 570,753 and U.S. Pat. 3,313,743. In addition, this new catalyst system is not only highly active but also produces high yields of polymer without any diminution of rate.

In application S.N. 570,753, now U.S. Pat. No. 3,499,-847, there are described and claimed certain catalyst systems capable of producing ultra-high molecular weight polyalkylene oxides, particularly the coordinate anionic polymerization systems such as those catalyzed by (a) metal oxygen bond catalytic systems; (b) alkaline earth compound catalytic systems and other (c) miscellaneous catalytic systems, which are described on pages 10–13 of the above application.

The essence of the present invention is the use of nitro compounds preferably nitro aromatics in conjunction with these catalyst systems so as to not only control the average molecular weight but to also yield a more monodisperse polymer as compared to corresponding polymers similarly prepared but without the nitro compounds.

Although any of the above catalyst systems can be employed, S.N. 570,753 specifically illustrates the preparation of ultra-high molecular weight polyalkylene oxides with certain metal alkyl systems such as trialkyl aluminum-acetyl acetone-water and dialkyl zinc-water. Therefore, the present invention will be illustrated by these same systems except that they are modified by the nitro-compounds of this invention. The methods of preparation described in S.N. 570,753 are employed except for the presence of nitro compounds, preferably nitro aromatic compounds.

The nitro compounds employed herein include any nitro compound which can modify the catalyst system in the manner intended without destroying the effectiveness of the system.

These nitro compounds may be illustrated by the following general formula: $R(NO_2)_n$ where R is an organic moiety that does not destroy the effectiveness of the catalyst system, for example, an aliphatic hydrocarbon such as alkyl, an aromatic moiety, etc., and $n$ is a number, for example 1–3 or higher, indicating the number of nitro groups in the molecule. R may contain 1 or more rings, alone or condensed, and may have other groups in addition to the aromatic group. For example, the aromatic groups may be substituted with halogen, amino, aliphatic, or other groups. The following are illustrative examples:

(I) $RNO_2$ where R is alkyl, preferably lower alkyl, for example $CH_3NO_2$, $C_2H_5NO_2$, $C_3H_7NO_2$, $C_4H_9NO_2$, etc.

(II) $A(NO_2)_n$, for example, where A is aryl or substituted aryl,
nitrobenzene, ortho, meta-, para-nitrotoluene,
chlorodinitrobenzene (various isomers),
nitrophenylphenylamine (various isomers),
2,4'-dinitrobiphenyl, dinitrodiphenylamine (various isomers),
4,4'-dinitrobiphenyl,
2,4-dinitrotoluene, ortho-, meta- or para-dinitrobenzene
1,3,5-trinitrobenzene, etc.,
α-nitronaphthalene, etc.

The nitro compounds are particularly effective in controlling the molecular weight of the polymer produced by the polymerization of an oxirane with the catalyst formed by reacting an organoaluminum compound with water and/or a chelating agent. Exemplary of the organoaluminum compounds that may be chelated and/or reacted with water and used are trialkylaluminum compounds, tricycloalkylaluminum compounds, triarylaluminum compounds, dialkylaluminum hydrides, monoaluminalkyl dihydrides, dialkylaluminum halides, monoalkylaluminum dihalides, dialkylaluminum alkoxides, monoalkylaluminum dialkoxides, and complexes of these compounds, as for example, the alkali metal aluminum tetraalkyls such as lithiumaluminum tetraalkyl, etc. Thus, these compounds may be defined as any aluminum compound containing an aluminum to carbon bond or having the formula $AlRX_2$ where R is any alkyl, cycloalkyl, aryl, or alkaryl radical and X may be alkyl, such as methyl, ethyl, propyl, isopropyl, n-butyl, isobutyl, amyl, hexyl, octyl, decyl, etc., aryl, such as phenyl, tolyl, halophenyl, etc., cycloalkyl, such as cyclohexyl, etc., hydrogen, halogen, such as chlorine, fluorine, or bromine, etc. Exemplary of such compounds are triethylaluminum, diethylaluminum hydride, diethylaluminum chloride, ethylaluminum dihydride, ethylaluminum dichloride, ethylaluminum dibromide, triisobutylaluminum, diisobutylaluminum hydride, tri-n-amylaluminum, trihexylaluminum, tridecylaluminum, triphenylaluminum, tricyclohexylaluminum, etc. In some cases it may be desirable to complex the organoaluminum compound with a complexing agent such as tetrahydrofuran, as for example, triisobutylaluminum complexed with a molar amount of tetrahydrofuran, etc.

The organoaluminum compound can be chelated and used or both chelated and reacted with water and used as the catalyst in accordance with this invention. Any alkylaluminum chelates and alkylaluminum enolates such as those formed by reacting a trialkylaluminum or dialkylaluminum hydride such as triethylaluminum, triisobutylaluminum, diisobutylaluminum hydride, etc., with an organic compound that is capable of forming a ring by coordination with its unshared electrons and the aluminum atom can be used. Preferably these chelating agents are characterized by two functional groups, one of which is an —OH group or —SH group, as for example, a hydroxyl, or an enol of a ketone, sulfoxide or sulfone, an OH of a carboxyl group, etc., which —OH or —SH group interacts with the trialkylaluminum or dialkylaluminum hydride to form a conventional, covalent aluminum-oxygen bond or aluminum-sulfur bond. The second functional group is one which contains an oxygen, nitrogen, or sulfur atom that forms a coordinate bond with the aluminum. The amount of chelating agent reacted with the alkyl-aluminum compound will generally be within the range of from about 0.01 to about 1.5 moles of chelating agent per mole of aluminum and preferably will be from about 0.1 to about 1 mole per mole of aluminum alkyl. Exemplary of the chelating agents that may be reacted with a trialkylaluminum or dialkylaluminum hydride and the chelate then reacted with water to produce the catalysts of this invention are diketones, such as acetylacetone, trifluoroacetylacetone, acetonylacetone, benzoylacetone, furoylacetone, thionyltrifluoroacetone, dibenzoyl methane, 3-methyl-2,4-pentanedione, 3-benzyl-2,4-pentanedione, etc., ketoacids, such as acetoacetic acid, ketoesters such as ethyl acetoacetate, ketoaldehydes such as formylacetone, hydroxyketones such as o-hydroxyacetophenone, 2,5-dihydroxy-p-benzoquinone, etc., hydroxyaldehydes such as salicylaldehyde, hydroxy esters such as ethyl glycolate, 2-hydroxyethyl acetate, dicarboxylic acids and their esters such as oxalic acid, malonic acid, etc., monoesters of oxalic acid, mono- and diesters of malonic acid, etc., dialdehydes such as malonaldehyde, alkoxyacids such as ethoxyacetic acid, ketoximes such as 2,3-butane-dione-monoxime, dialdehyde monoximes such as glyoxal monoxime, hydroxamic acids such as N-phenyl benzohydroxamic acid, dioximes such as dimethyl glyoxime, etc. Chelating agents with two or more chelating functions may also be used, as for example, 2,5-dihydroxy-p-benzoquinone, bis(1,3-diketones) such as

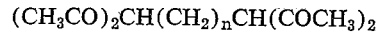

where $n$ is 2, 6 or 10, bis(1,2-ketoximes), bis(1,2-dioximes), etc.

Regardless of the organoaluminum compound that is used, it should be reacted with water as set forth above in a molar ratio of from about 0.1 mole of water per mole of organoaluminum compound up to about 1.5 moles of water per mole of aluminum compound. Slightly higher amounts of water may be used but at a ratio of about 2 moles of water to 1 mole of organoaluminum compound, there is little or no improvement over the use of no water in the polymerization system and when the ratio of water to organoaluminum compound gets appreciably above 2:1, it has an adverse effect and the polymerization is retarded or otherwise adversely affected. Preferably the molar ratio of water to organoaluminum compound will be in the range of from about 0.2:1 to about 1:1. The exact amount of water will depend to some extent on the organoaluminum compound, the epoxide or oxetane being polymerized, the diluent, temperature, etc.

Any desired procedure may be used for reacting the organoaluminum compound with the specified molar ratio of water. Generally, better results are obtained if the organoaluminum compound and water are preracted. This may readily be done, and preferably is done, by adding the specified amount of water gradually to a solution of the organoaluminum compound in an inert diluent, as for example, a hydrocarbon diluent such as n-hexane, toluene, or an ether such as diethyl ether or a mixture of such diluents. It may also be done in the absence of a diluent. If a chelating agent is used, it may be added before or after reacting with water, or the chelating agent and water may be added together.

Any amount of the organoaluminum-water-chelating agent-nitro compound reaction product may be used to catalyze the polymerization process in accordance with this invention from a minor catalytic amount up to a large excess but, in general, will be within the range of from about 0.2 to 10 mole percent based on the monomer being polymerized and preferably will be within the range of from about 1 to about 5 mole percent based on the monomer being polymerized. The amount used depends in part on such factors as monomer purity, diluent purity, etc.

The amount of nitro compound which is effective can vary widely. In general, a trace amount is capable of preparing the mono-disperse polymer. Although large amounts of nitro compounds are also capable of effecting similar results for example in solvent amounts, there appears to be no commercial advantage in using large amounts of nitro compounds when trace amounts are effective. In practice, we employ from about 0.01 to 10 moles or more of nitro compounds especially nitro aromatic compounds per mole of metal in the catalyst system, such as from about 0.05 to 2 moles, but preferably from about 0.2 to 1 mole. Apart from this addition the polymerization conditions described in S.N. 570,753 are employed.

This patent application is, by reference, incorporated into the present application as if part hereof. The nitro compound can be added together with the water and/or chelating agent but preferably is added separately to the aluminum compound after the water and chelating agent are added. It can be added at once, in increments or continuously throughout the polymerization.

The polymerization reaction may be carried out by any desired means, either as a batch or continuous process with the catalyst added all at one time or in increments during the polymerization or continuously throughout the polymerization. If desired, the monomer may be added gradually to the polymerization system. It may be carried out as a bulk polymerization process, in some cases at the boiling point of the monomer (reduced to a convenient level by adjusting the pressure) so as to remove the heat of reaction. However, for ease of operation, it is more generally carried out in the presence of an inert diluent. Any diluent that is inert under the polymerization reaction conditions may be used, as for example, ethers such as the dialkyl, aryl or cycloalkyl ethers, as for example, diethyl ether, dipropyl ether, diisopropyl ether, aromatic hydrocarbons such as benzene, toluene, etc., or saturated aliphatic hydrocarbons and cycloaliphatic hydrocarbons such as n-heptane, cyclohexane, etc., and halogenated hydrocarbons, as for example, chlorobenzene or halogenated hydrocarbons, as for example, chlorobenzene or haloalkanes such as methyl chloride, methylene chloride, chloroform, carbon tetrachloride, ethylene dichloride, etc. Obviously, any mixture of such diluents may be used in many cases as preferable.

The polymerization process in accordance with this invention may be carried out over a wide temperature range and pressure. Usually, it will be carried out at a temperature from about −80° C. up to about 250° C., preferably from about 0° C. up to about 150° C., and more preferably within the range of about +30° C. to about 100° C. The influence of the effect of the aromatic nitrocompound on molecular weight of the polymers prepared at different temperatures is less pronounced at lower temperatures. For this reason we preferably carry out these polymerizations above room temperature and especially at temperatures in the range from 40–100° C. The optimum conditions for obtaining these desired effects vary to a certain extent with the kind and amounts of nitrocompound used. Usually, the polymerization process will be carried out at autogenous pressure, but superatmospheric pressures up to several hundred pounds may be used if desired and in the same way, subatmospheric pressures may also be used.

The term "alkylene oxide," or "oxirane" as used herein means a compound containing the following 1,2-epoxy group

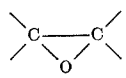

and wherein each unsatisfied epoxy carbon valence of said group is satisfied for example by hydrogen, a hydrocarbon radical, a substituted group for example an ether-containing group, a halogen-containing group, or other radicals which do not interfere with the polymerization process. In addition, the unsatisfied epoxy carbon valences collectively can represent a divalent aliphatic hydrocarbon radical which together with the epoxy carbon atoms form a ring containing, for example, from 5 to 10 carbon atoms inclusive. It is to be understood, also, that the term "lower alkylene oxides" designates that each unsatisfied epoxy carbon valence of the above-depicted structural unit can be satisfied by hydrogen, a lower alkyl, e.g. methyl, ethyl, propyl, etc., substituted derivatives thereof, and the like.

The term "saturated alkylene oxides," "saturated oxiranes," "saturated lower alkylene oxides" or "saturated lower alkylene oxiranes" indicates that the oxide or oxirane has no unsaturated groups, i.e., all of the unsatisfied carbon valences of the above structure are satisfied with hydrogen or a saturated group. This does not exclude aromatic groups.

For example, the monomeric alkylene oxides employed are vicinal-epoxyhydrocarbons which have a single vicinal epoxy group which can be characterized by the following formula:

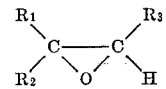

wherein $R_1$, $R_2$ and $R_3$ are hydrogen, a hydrocarbon radical, a haloalkyl or aryl radical, an ether-containing radical or other types that do not interfere with the polymerization procedures such as certain nitrogen containing derivatives sulfur-containing groups, ester groups, etc., $R_1$, $R_2$ and $R_3$ are preferably saturated alkyl groups.

Representative alkylene oxide monomers which can be employed are those in which $R_2$ and $R_3$ are hydrogen and $R_1$ is an organic radical such as alkyl, aryl, halogen-containing alkyl or aryl, ether-containing alkyl or aryl, ester-containing alkyl or aryl or mixtures of these types. Specific examples are ethylene oxide (where $R_1$ is also hydrogen), 1,2-pentene oxide, 1,2-hexene oxide, 1,2-octene oxide, 1,2-decene oxide, 1,2-dodecene oxide, propylene oxide 1,2-butylene oxide, higher 1,2-epoxy alkanes, styrene oxide, o, m, or p-alkyl-styrene oxide, epichlorohydrin, epibromohydrin, epifluorohydrin, 1,1,1-trifluoro-2-propylene oxide, chlorostyrene oxide, methyl glycidyl ether, ethyl glycidyl ether, isopropyl glycidyl ether, methyl glycidyl ether of propylene glycol, methyl glycidyl ether of dipropylene glycol, methyl glycidyl ether of tripropylene glycol, hexyl glycidyl ether, α-chloroethyl glycidyl ether, phenyl glycidyl ether, benzyl glycidyl ether o-, m-, and p-chlorophenyl glycidyl ether, o-, m-, and p-methylphenyl glycidyl ether, glycidyl pivalate, trimethylsilyl glycidyl ether, butyl glycidyl formal, diethylglycidyl amine, N-(2,3-epoxypropyl) morpholine, N,N-dimethyl aminoethyl glycidyl ether, etc.

Other representative epoxides which can be used are those in which $R_3$ is hydrogen and both $R_1$ and $R_2$ are organic radicals generally defined as above for $R_1$. Specific examples are, isobutylene oxide, α-methyl styrene oxide, 1,1-diphenylethylene oxide, 1,1,1-trifluoro-2-methyl-2-propylene oxide, methylmethacrylate oxide, methylene cyclohexane oxide, etc.

Other representative epoxides which can be employed are those in which $R_2$ is hydrogen and $R_1$ and $R_2$ are organic radicals generally defined as above. Specific examples are cis- and trans-2-butene oxide, 1,1,1-trifluoro-2-butene oxide, cyclohexene oxide, etc.

Trisubstituted ethylene oxides can also be employed in which $R_1$, $R_2$ and $R_3$ are all organic radicals as defined above. Trimethyl ethylene oxide is illustrative of this type. Furthermore tetrasubstituted ethylene oxides may be employed such as tetramethyl ethylene oxide.

It is preferred that the oxide be a monosubstituted ethylene oxide type in which $R_2$ and $R_3$ are hydrogen as described above. If a homopolymer is used, then it is preferred that a lower alkylene oxide be employed. In polymerizing an admixture comprising two different alkylene oxides, it is further preferred that one of the alkylene oxides be a lower alkylene oxide.

The polyalkylene oxides of this invention have a molecular weight of from at least about 100,000 up to 10 million or greater, for example, from about 150,000 to 5 million but preferably from about 200,000 to 2 million and are in general insoluble in water but soluble in organic solvents. For convenience, viscosity rather than molecular weight measurements are generally employed, i.e., intrinsic viscosities in benzene at 33° C. are at least about 0.7 such as from about 1 to 15 or higher, for example from about 1.5 to 7, but preferably from about 2 to 6.

The molecular weight of polymers has different values which are dependent upon the methods used for its determination. Weight average molecular weight determined by light scattering can be much higher than a number average molecular weight as determined by, for example, osmosis measurements. The ratio of weight average molecular weight to number average molecular weight, $M_{wt.\ av.}/M_{No.\ av.}$, is a good indication of molecular weight distribution. The lower this ratio (i.e., the closer it is to one) the narrower the molecular weight distribution. A fully monodisperse polymer would have a $M_{wt.\ av.}/M_{No.\ av.}$ equal to 1. The indication of the ratio of weight average and number average molecular weight can also be determined by gel permeation chromotography.

We prefer to characterize the polymers prepared with our catalyst system by viscosity measurements, which can be more readily carried out. More specifically these polymers are characterized by intrinsic viscosities. These can in special cases be readily converted to viscosity molecular weights, which are in general intermediate between weight average and number average molecular weight.

The intrinsic viscosity of a polymer is a measure of the size and shape of the polymer and thus is an indication of its molecular weight. The unit employed herein is dl./g. (deciliters per gram). Intrinsic viscosity can be obtained by plotting reduced viscosity against concentration and extrapolating to zero concentration. The reduced viscosity of a polymer is obtained by dividing the specific viscosity by the concentration of the polymer in solution, the concentration being measured in grams of polymer per 100 ml. of solvent; the specific viscosity is obtained by dividing the difference between the viscosity of the solution and the viscosity of the pure solvent by the viscosity of the solvent. The term "reduced viscosity" is described on page 128 of "Textbook of Polymer Chemistry" by Billmeyer, Interscience Publishers, 1957. The relationship of intrinsic viscosity to reduced viscosity is given in the Huggins equation in "High Polymers, vol. II—Physical Chemistry of High Polymeric Systems" second edition, by H. Mark and A. V. Tobolsky, Interscience, New York (1950), page 301. A further description of "intrinsic viscosity" and its relation to molecular weight appears in pages 308 to 314 of "Principles of Polymer Chemistry," P. J. Flory.

The intrinsic viscosity can be related to a viscosity molecular weight by the expression $$[\eta] = KM^a$$

where $[\eta]$ is intrinsic viscosity, M is viscosity molecular weight and where "K" and "a" are constants. Unless otherwise stated viscosities are run in benzene as solvent at 33° C. To determine molecular weight values for polypropylene oxide the values used for the constants are: $K = 1.12 \times 10^{-4}$; $a = 0.77$.

These values were obtained for benzene solvent at 25° C. as described by G. Allen, C. Booth and M. N. Jones, Polymer, 5, 195 (1964). It is not expected that an eight degree change in temperature would affect this relationship (note p. 199 of the above cited reference). Benzene is a good solvent for this polymer.

Polymers and copolymers other than polypropylene oxide will generally show a different relationship between intrinsic viscosity and molecular weight. If the other polymer displays a lesser solubility in benzene than polypropylene oxide they will tend to have a higher molecular weight for the same intrinsic viscosity.

The intrinsic viscosities of these polymers when used for demulsification as described in this invention are desirably within the range of about 1 to 15 or higher, more preferably between 1.5 and 7, and most desirably from 2 to 6.

Any of the polymerization catalysts referred to herein may be employed. However, it is preferable to employ certain metal alkyl systems such as trialkyl aluminum-chelating agent-water, a nitro compound, as generally described above and as specifically illustrated in the examples.

GENERAL PROCEDURE

The preferred catalyst system was composed of a trialkyl aluminum, a chelating agent, water and a nitro compound. For sake of illustration this procedure describes a catalyst system prepared by combining triisobutyl aluminum, acetyl acetone, water and nitrobenzene in a molar ratio of 1.0:0.5:0.33:variable, respectively.

To 87 ml. of benzene was added 13 ml. (0.05 mole) of triisobutyl aluminum. A mixture of 50 g. (0.50 mole) of acetyl acetone and 6.0 g. (0.33 mole) of water was diluted to a volume of 100 ml. with dioxane. Five ml. of this latter solution was added to the triisobutyl aluminum solution with stirring. The temperature was about 65° C. After the solution cooled, the evaporated benzene was replaced to give a total volume of 100 ml. One ml. of this solution contained 0.5 millimole trialkyl aluminum.

When tripropyl aluminum or diisobutyl aluminum hydride was used, the same catalyst system preparation was employed using 0.05 mole of those latter catalysts. When other ratios of co-catalyst were used (as indicated in the following table) the molar ratio of reagents was adjusted, keeping other conditions constant.

The nitrobenzene was added, unless otherwise noted, as a 0.5 molar solution prepared by dissolving 6.15 g. of nitrobenzene in dry benzene to give a total volume of 100 ml. When other nitro compounds were used they were likewise added as 0.5 molar solutions.

Into each soda bottle was added the solvent, the above triisobutyl aluminum/acetyl acetone/water catalyst solution, nitrobenzene solution and alkylene oxide as indicated in the following tables. The bottles were capped and placed in a constant temperature bath (or at room temperature) for varying periods of time.

The polymerization reaction time may vary from an hour or less to as long as a week or longer. In general, the higher the temperature (at least up to the range of near 100° C.), and the greater the catalyst concentration, the faster the polymerization, and therefore, the shorter the reaction time. We prefer to carry out the polymerization using conditions such that relatively good yields of polymer can be obtained in 4–48 hours.

The polymers were worked up by diluting the reaction product with ether-containing 3% alcohol, washing with 3% HCl, once with water, once with 2% $NaHCO_3$ and once again with water. The solutions were treated with 0.5% phenothiazine (based on the original oxide) evaporated and finally dried under vacuum.

It is generally not necessary to isolate the polymer when they are used as demulsifiers as described hereinafter. The reaction product can be employed directly after destroying the catalyst with alcohol, water or acid and adjusting the solvent (i.e., adding aromatic extracts, removing more volatile ones) or blending with other appropriate demulsifiers when used for this application as described later. It may at times be appropriate to add oxidation inhibitors such as phenothiazine, etc.

Reagents and equipment were conditioned as follows: Solvents were dried over calcium hydride and flushed with nitrogen before use. Acetyl acetone was dried over sodium carbonate redistilled and flushed with nitrogen. Propylene oxide, ethylene oxide and nitrobenzene (or other nitro compounds) were used as received. Other oxides were distilled, dried over calcium hydride and redistilled. All glassware was baked at 125–175° C. and cooled under nitrogen. All manipulations and preparations were carried out in a dry box in pure nitrogen atmosphere.

For convenience the details and results of these examples are placed in the following tables.

TABLE 1

| Example: | Catalyst system Components mole ratio | Ml. cat.[1] solin. | Nitro compound ml.[2] g. | Mole percent metal alkyl to oxide | Monomer, oxide grams, moles |
|---|---|---|---|---|---|
| 1 | Tiba/Acac(H₂O/Nb 1/0.5/0.33/25 | 10 | 15.4 | 2 | PrO 14.5(0.25) |
| 2 | Tiba/Acca/H₂O/Nb 1/0.5/0.33/10 | 10 | 6.2 | 2 | PrO 14.5(0.25) |
| 3 | Tiba/Acac/H₂O/Nb 1/0.5/0.33/5 | 10 | 3.1 | 2 | PrO 41.5(0.25) |
| 4 | Tiba/Acac/H₂O/Nb 1/0.5/0.33/1.5 | 10 | 15 | 2 | PrO 14.5(0.25) |
| 5 | Tiba/Acac/H₂O/Nb 1/0.5/0.33/1 | 10 | 10 | 2 | PrO 14.5(0.25) |
| 6 | Tiba/Acac/H₂O/Nb 1/0.5/0.33/0.50 | 10 | 5 | 2 | PrO 14.5(0.25) |
| 7 | Tiba/Acac/H₂O/Nb 1/0.5/0.33/0.25 | 10 | 2.5 | 2 | PrO 14.5(0.25) |
| 8 | Tiba/Acac/H₂O/Nb 1/0.5/0.33/0.10 | 10 | 1 | 2 | PrO 14.5(0.25) |
| 9 | Tiba/Acac/H₂O/Nb 1/0.5/0.33/0.05 | 10 | 0.5 | 2 | PrO 14.5(0.25) |
| 10 | Tiba/Acac/H₂O/Nb 1.0.5/0.33/0.025 | 10 | 0.25 | 2 | PrO 14.5(0.25) |
| 11 | Tiba/Acac/H₂O/Nb 1/0.5/0.33/0.010 | 10 | 0.1 | 2 | PrO 14.5(0.25) |
| 12 | Tiba/Acac/H₂O/Nb 1/0.5/0.33/0.005 | 10 | 0.05 | 2 | PrO 14.5(0.25) |
| 13 | Tiba/Acac/H₂O/Nb 1/0.5/0.33/0.0025 | 10 | 0.025 | 2 | PrO 14.5(0.25) |
| 14 | Tiba/Acac/H₂O/Nb 1/0.5/0.33/0 | 10 | None | 2 | PrO 14.5(0.25) |
| 15 | Tnpa/Acac/H₂O/Nb 1/0.5/.33/1 | 10 | 10 | 2 | PrO 14.5(0.25) |
| 16 | Tnpa/Acac/H₂O/Nb 1/0.5/0.33/0 | 10 | None | 2 | Pro 14.5(0.25) |
| 17 | Tiba/Acac/H₂O/Nb | 10 | 15 | 2 | PrO 11.6(0.2), EtO 2.2(0.05) |
| 18 | Tiba/Acac/H₂O/Nb 1/0.5/0.33/1.0 | 10 | 10 | 2 | PrO 11.6(0.2), EtO 2.2(0.05) |
| 19 | Tiba/Acac/H₂O/Nb 1/0.5/0.33/0 | 10 | 5 | 2 | PrO 11.6(0.2), EtO 2.2(0.05) |
| 20 | Tiba/Acac/H₂O/Nb 1/0.5/0.33/0 | 10 | None | 2 | PrO 11.6(0.2), EtO 2.2(0.05) |
| 21 | DibaH/Acac/H₂O/Nb 1/0.5/0.33/1 | 10 | 10 | 2 | PrO 14.5(0.25) |
| 22 | DibaH/Acac/H₂O/Nb 1/0.5/0.33/0 | 10 | None | 2 | PrO 14.5(0.25) |

| Example: | Solvent, type, Ml. | Reaction Time, Hrs. | Reaction Temp., °C. | Product Yield, percent yield, g. | [η] dl./g. | Remarks |
|---|---|---|---|---|---|---|
| 1 | Benzene, 40 | 48 | 55 | 59, 8.5 | 0.81 | Soft, non-sticky rubber. |
| 2 | do | 48 | 55 | 86, 12.5 | 1.6 | Do. |
| 3 | do | 48 | 55 | 88, 12.7 | 2.1 | Do. |
| 4 | Benzene, 25 | 48 | 55 | 89, 13.0 | 3.7 | Do. |
| 5 | Benzene, 30 | 48 | 55 | 87, 10.8 | 3.0 | Do. |
| 6 | Benzene, 35 | 48 | 55 | 87, 12.8 | 2.6 | Do. |
| 7 | Benzene, 37.5 | 48 | 55 | 94, 13.69 | 3.6 | Do. |
| 8 | Benzene, 39 | 48 | 55 | 90, 13.1 | 3.3 | Do. |
| 9 | Benzene, 40 | 48 | 55 | 94, 13.7 | 3.0 | Do. |
| 10 | do | 48 | 55 | 97, 14.1 | 3.1 | Do. |
| 11 | do | 48 | 55 | 93, 13.5 | 3.4 | Do. |
| 12 | do | 48 | 55 | 94, 13.7 | 5.8 | Rubbery. |
| 13 | do | 48 | 55 | 96, 13.9 | 7.6 | Tough, snappy rubber. |
| 14 | do | 48 | 55 | 93, 13.5 | 9.4 | Control with no nitrobenzene. Tough, snappy rubber. |
| 15 | Benzene, 30 | 48 | 55 | 87, 12.8 | 3.2 | Soft, non-sticky rubber. |
| 16 | Benzene, 40 | 48 | 55 | 94, 13.7 | 9.3 | Control with no nitrobenzene. Tough, snappy rubber. |
| 17 | Benzene, 25 | 48 | 55 | 95, 13.1 | 3.9 | Soft, non-sticky rubber. |
| 18 | Benzene, 30 | 48 | 55 | 100, 13.8 | 3.8 | Do. |
| 19 | Benzene, 35 | 48 | 55 | 99, 13.6 | 3.7 | Do. |
| 20 | Benzene, 40 | 48 | 55 | 100+, 14.05 | 8.5 | Control with no nitrobenzene. Tough, snappy rubber. |
| 21 | Benzene, 30 | 48 | 55 | 94, 13.7 | 2.81 | |
| 22 | Benzene, 40 | 48 | 55 | 94, 13.6 | 4.50 | Control with no nitrobenzene. |

See footnotes at end of Table 4.

TABLE 2

| Example: | Catalyst system Components, mole ratio | Ml. cat.[1] soln. | Nitro compound, ml.[2] | Mole percent metal alkyl to oxide | Monomer, oxide, grams, moles |
|---|---|---|---|---|---|
| 23 | Tiba/Acac/H₂O/Nb 1/0/0.33/0.5 | 10 | 5 | 2 | PrO 14.5(0.25) |
| 24 | Tiba/Acac/H₂O/Nb 1/0/0.33/0 | 10 | None | 2 | PrO 14.5(0.25) |
| 25 | Tiba/Acac/H₂O/Nb 1/0.2/0.33/0.5 | 10 | 5 | 2 | PrO 14.5(0.25) |
| 26 | Tiba/Acac/H₂O/Nb 1/0.2/0.33/0 | 10 | None | 2 | PrO 14.5(0.25) |
| 27 | Tiba/Acac/H₂O/Nb 1/0.4/0.33/0.5 | 10 | 5 | 2 | PrO 14.5(0.25) |
| 28 | Tiba/Acac/H₂O/Nb 1/0.6/0.33/0.5 | 10 | 5 | 2 | PrO 14.5(0.25) |
| 29 | Tiba/Acac/H₂O/Nb 1/0.8/0.33/0.5 | 10 | 5 | 2 | PrO 14.5(0.25) |
| 30 | Tiba/Acac/H₂O/Nb 1/0.8/0.33/0 | 10 | None | 2 | PrO 14.5(0.25) |
| 31 | Tiba/Acac/H₂O/Nb 1/1.0/0.33/0.5 | 10 | 5 | 2 | PrO 14.5(0.25) |
| 32 | Tiba/Acac/H₂O/Nb 1/1.0/0.33/0 | 10 | None | 2 | PrO 14.5(0.25) |
| 33 | Tiba/Acac/H₂O/Nb 1/1.0/0.33/1 | 10 | 10 | 2 | PrO 14.5(0.25) |
| 34 | Tiba/Acac/H₂O/Nb 1/0.5/0/1 | 10 | 10 | | PrO 14.5(0.25) |
| 35 | Tiba/Acac/H₂O/Nb 1/0/0/1 | 10 | 10 | | PrO 14.5(0.25) |

| Example: | Solvent type, ml. | time, hrs. | temp., °C. | Yield, percent, yield, g. | [η], dl./g. | Remarks |
|---|---|---|---|---|---|---|
| 23 | Benzene, 35 | 48 | 55 | 70, 10.1 | 1.0 | |
| 24 | Toluene, 40 | 48 | 55 | 82, 11.9 | 1.5 | Control with no nitrobenzene. |
| 25 | Benzene, 35 | 48 | 55 | 95, 13.8 | 3.2 | |
| 26 | Benzene, 40 | 48 | 55 | 92, 13.3 | 4.2 | Do. |
| 27 | Benzene, 35 | 48 | 55 | 97, 14.0 | 2.4 | |
| 28 | do | 48 | 55 | 90, 13.0 | 2.1 | |
| 29 | do | 48 | 55 | 96, 13.9 | 2.2 | |
| 30 | Toluene, 40 | 48 | 55 | 98, 14.2 | 11.3 | Do. |
| 31 | Benzene, 35 | 48 | 55 | 89, 12.9 | 3.6 | |
| 32 | Toluene, 40 | 48 | 55 | 84, 12.2 | 10.3 | Do. |
| 33 | Benzene, 30 | 48 | 55 | 71, 10.3 | 2.1 | |
| 34 | do | 48 | 55 | 34, 4.9 | 3.2 | |
| 35 | do | 48 | 55 | 30, 4.4 | 2.0 | |

Note.—See footnotes at end of Table 4.

TABLE 3

| Ex. | Catalyst system Components, mole ratio | Ml. cat.[1] soln. | Nitro compound, ml.[2] | Mole, percent metal alkyl to oxide | Monomer, oxide, grams, moles | Solvent, type, ml. | Reaction Time, hrs. | Reaction Temp., °C. | Product Yield, percent; yield, g. | [η] dl./o. | Remarks |
|---|---|---|---|---|---|---|---|---|---|---|---|
| 36 | Tiba/Acac/H₂O/ nitropropane 1/0.5/0.33/1.0 | 10 | 10 | 2 | Pro 14.5 (0.25) | Benzene, 30 | 48 | 55 | 83, 12.0 | 5.5 | |
| 37 | Tiba/Acac/H₂O/ o-dinitrobenzene 1/0.5/0.33/1.0 | 10 | 10 | 2 | PrO 14.5 (0.25) | do | 48 | 55 | 49, 7.1 | 2.0 | |
| 38 | Tiba/Acac/H₂O/ nitromethane 1/0.5/0.33/0.5 | 10 | 5 | 2 | PrO 14.5 (0.25) | Benzene, 35 | 48 | 55 | 59, 8.5 | 2.4 | |
| 39 | Tiba/Acac/H₂O/ nitromethane 1/0.5/0.33/2 | 10 | 20 | 2 | PrO 14.5 (0.25) | Benzene, 20 | 48 | 55 | 31, 4.5 | 2.7 | |
| 40 | Tiba/Acac/H₂O/ 1-nitronaphthalene 1/0.5/0.33/1.0 | 10 | 10 | 2 | PrO 14.5 (0.25) | Benzene, 30 | 48 | 55 | 90, 13.2 | 6.0 | |
| 41 | Tiba/Acac/H₂O/ o-nitrotoluene 1/0.5/0.33/1.0 | 10 | 10 | 2 | PrO 14.5 (0.25) | do | 48 | 55 | 92, 13.4 | 1.9 | |
| 42 | Tiba/Acac/H₂O) m-dinitrobenzene 1/0.5/0.33/1.0 | 10 | 10 | 2 | PrO 14.5 (0.25) | do | 48 | 55 | 95, 13.8 | 3.0 | |
| 43 | Tiba/Acac/H₂O/ 2,4-dinitrotoluene 1/0.5/0.33/1.0 | 10 | 10 | 2 | PrO 14.5 (0.25) | do | 48 | 55 | 84, 12.9 | 2.2 | |

Note.—See footnotes at end of Table 4.

TABLE 4

| Ex. | Components, mole ratio | Ml. cat.[1] soln. | Nitro compounds ml.[2] | Mole percent metal alkyl to oxide | Monomer oxide, grams, moles | Solvent, type, ml. |
|---|---|---|---|---|---|---|
| 44 | Tiba/Acac/H₂O/Nb 1/0.5/0.33/1.0 | 5 | 5 | 1 | Pro 14.5 (0.25) | Benzene, 35. |
| 45 | Tiba/Acac/H₂O/Nb 1/0.5/0.33/0.5 | 10 | 10 | 2 | Pro 14.5 (0.25) | Benzene, 30. |
| 46 | Tiba/Acac/H₂O/Nb 1/0.5/0.33/0 | 10 | None | 2 | Pro 14.5 (0.25) | Benzene, 40. |
| 47 | Tiba/Acac/H₂O/Nb 1/0.5/0.33/0.5 | 10 | 10 | 2 | Pro 14.5 (0.25) | Benzene, 30. |
| 48 | Tiba/Acac/H₂O/Nb 1/0.5/0.33/0 | 10 | None | 2 | Pro 14.5 (0.25) | Benzene, 40. |
| 49 | Tiba/Acac/H₂O/Nb 1/0.5/0.33/1.0 | 10 | 10 | 2 | Pro 14.5 (0.25) | Benzene, 30. |
| 50 | Tiba/Acac/H₂O/Nb 1/0.5/0.33/1.0 | 10 | 10 | 2 | Pro 14.5 (0.25) | Do. |
| 51 | Tiba/Acac/H₂O 1/0.075/0.33 | 10 | None | 2 | Pro 14.5 (0.25) | Do. |

| Ex. | Reaction Time, hrs. | Reaction Temp., °C. | Product Yield, percent; yield, g. | $[\eta]$, dl./g. | Remarks |
|---|---|---|---|---|---|
| 44 | 48 | 55 | 87, 12.6 | 4.5 | |
| 45 | 6 | 55 | 70, 10.1 | 3.6 | |
| 46 | 6 | 55 | 79, 11.5 | 5.3 | Control with no nitrobenzene. |
| 47 | 1 | 55 | 30, 4.3 | 3.2 | |
| 48 | 1 | 55 | 37, 5.4 | 5.2 | Do. |
| 49 | 48 | 25 | 81, 11.8 | 3.5 | |
| 50 | 48 | 75 | 95, 13.8 | 1.5 | |
| 51 | 48 | 55 | 91, 13.2 | 2.3 | Control in which mol. wt. was lowered by adjusting Acac level. |

[1] Compound of R₃Al/Acac/H₂O. 1 ml. of solution containing 0.5 millimole metal alkyl.
[2] 1 ml. of solution contains 0.5 millimole of nitro compound added in solution unless otherwise noted.

NOTE.—catalyst:
Acac=acetyl acetone.
DibaH=disobutyl aluminum hydride.
Nb=nitrobenzene.
Tiba=triisobutyl aluminum.
Tnpa=tri-n-propyl aluminum.
ETO=ethylene oxide.
PrO=propylene oxide.

Summarizing these tables:

Table 1 demonstrates the effect of varying the ratio of nitrobenzene in the catalyst system. R₃Al/Acac/H₂O/Nb where ratio of the components are 1/0.5/0.33/variable, respectively.

Table 2 demonstrates the effect of varying the ratio of acetylacetone and water in the catalyst system with and without nitrobenzene present.

Table 3 demonstrates the effect of other nitro compounds included in the catalyst system R₃Al/Acac/H₂O/Nitro compound.

Table 4 demonstrates the effect of varying other reaction variables.

The above examples clearly demonstrate the ability of nitro compounds such as nitrobenzene and other selected nitro compounds lower the intrinsic viscosity (and molecular weight). Although there is a suggestion of slightly lower yields and rate of polymerization, this is probably due to slightly greater losses in working up the product. If the products are worked up by just hydrolyzing the catalyst, adding inhibitor and removing solvent by evaporation in an inert atmosphere, essentially quantitative yields are generally obtained.

It is most significant and unexpected that no broadening of molecular weight distribution ($M_{wt.av.}/M_{No.av.}$) was observed when selected products were analyzed by gel permeation chromatography. In fact there appeared to be a narrowing of molecular weight distribution. The following Table 5 demonstrates this effect.

TABLE 5

| Product of Ex. No.: | Catalyst composition, Tiba/Acac/H²O/Nb | $[\eta]$ | Mol. wt. dist., Mwt. avg./M no. avg. |
|---|---|---|---|
| 4 | 1/0.5/0.33/1.5 | 3.7 | 3.2 |
| 14 | 1/0.5/0.33/0 | 9.4 | 3.8 |
| 51 | 1/0.075/0.33/0 | 2.3 | 15.2 |

In comparing molecular weight data from the products of Examples No. 4 and 14 it is noted that the intrinsic viscosity is lowered from 9.4 to 3.7 by the incorporation of nitrobenzene in the catalyst system. Table 5 also demonstrates that the molecular weight distribution is narrowed by use of nitrobenzene.

It was found in S.N. 570,753 that molecular weight could be lowered by adjusting the acetyl acetone level in the catalyst system, but as Table 5 demonstrates, the polymer product (Ex. 51) has an extremely broad molecular weight distribution.

U.S. Pat. 3,313,743 described a method of lowering the molecular weight of oxirane polymers by adding carbonium ion precursors to the aluminum alkyl-chelating agent-water catalyst system; i.e., acetyl chloride, t-butyl alcohol, etc. Such procedures achieve this effect by introducing large quantities of lower molecular weight components. Although this has the effect of lowering molecular weight, it gives a broadening of molecular weight distribution. For unknown reasons nitro compounds have the unique ability to modify the aluminum alkyl-chelating agent-water catalyst system to produce a new catalyst system capable of lowering molecular weight without broadening molecular weight distribution and without otherwise affecting this highly active catalyst.

USE AS WATER-IN-OIL DEMULSIFIERS

This invention also relates to the use of these ultra high molecular weight polymers, such as in preventing, breaking or resolving emulsions of the water-in-oil type, and particularly petroleum emulsions. Their use provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

These novel demulsifying agents also provide an economical and rapid process for breaking and separating emulsions which have been prepared under controlled conditions from mineral oil, such as crude oil and relatively soft waters or weak brines. Controlled emulsification and subsequent demulsification, under the conditions just mentioned, are of significant value in removing impurities, particularly inorganic salts, from pipeline oil (i.e., desalting).

Demulsification, as contemplated in the present application, includes the preventive step of commingling the demulsifier with the hydrocarbon phase. Similarly, such demulsifiers may be mixed, emulsified, suspended, etc., in the aqueous component.

The ultra high molecular weight polymers of this invention are unexpectedly superior to low molecular weight polymers in resolving W/O emulsions, i.e., polymers having molecular weights of at least about 100,000, such as 100,000 to 10 million, for example 150,000 to 5 million, but preferably 200,000 to 2 million with an optimum of about 0.3–1.5 million; with the proviso that the polymer be (1) essentially water insoluble, i.e., soluble to the extent of less than about 0.1% by weight in water and (2) essentially solvent soluble in a solvent other than water, and preferably soluble in aromatic type solvents, for example having a solubility of at least about 1% by weight, but preferably at least about 5% in an aromatic solvent.

These solubilities may be in an aromatic hydrocarbon solvent alone (benzene, toluene, etc.) or in conjunction with other solvents, for example, lower alkanols (1–50% alkanol in aromatic solvent) such as methanol, ethanol, propanol, etc.

Although a wide variety of oxiranes can be polymerized in accord with the present invention, homopolymers of ethylene oxide cannot be used in W/O demulsification. It is believed that this is true because they are too water-soluble and even though they show solubility in organic solvents, they partition into the aqueous phase during the demulsification process where they are largely ineffective. However, ethylene oxide can be part of a copolymer composition. Its use in a copolymer is particularly beneficial in that it gives a balanced solubility due to its hydrophilic nature. Thus, when higher alkylene oxides are used it is often advantageous to copolymerize them with ethylene oxide. Where propylene oxide is used, some ethylene oxide may be advantageously employed, generally in amounts of less than 50 mole percent but preferably less than 30 mole percent. Other hydrophilic oxides such as methyl glycidyl ether (which like ethylene oxide have a carbon to ether oxygen ratio of 2 to 1) display activity somewhat related to ethylene oxide, and here again it is necessary to use copolymers with hydrophobic oxides. Thus, in general, the term hydrophobic oxide includes compounds in which the carbon to oxygen ratio would preferably be greater than about 2.5.

Thus, in W/O demulsification ultra-high molecular weight polymers of alkylene oxides which contain a sufficient number of hydrophobic oxyalkylene units in the polymer chain to make them substantially insoluble in water but soluble in organic solvents are employed. Hydrophobic oxyalkylene units are defined herein as being derived from alkylene oxides having more than two carbon atoms. Examples of hydrophobic alkylene oxides are oxides of the general formula

where A is a group having three or more carbon atoms. Illustrative examples are oxirane compounds of the formula

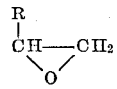

where R is, for example, alkyl but preferably lower alkyl—i.e., methyl, ethyl, propyl, butyl, etc. The preferred alkylene oxide is propylene oxide. Ethylene oxide, which yields oxyethylene units, is a hydrophilic alkylene oxide. These polymers include homopolymers of a hydrophobic alkylene oxide, copolymers of two or more hydrophobic oxides or one or more hydrophobic oxides in conjunction with ethylene oxide or other hydrophilic oxides described more fully hereafter.

In certain instances where the alkylene oxide contains a substituted group, an oxide, which contains three or more carbon atoms, may be classified as a hydrophilic alkylene oxide. For example, certain glycidyl compounds of the

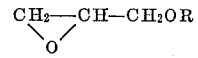

type having three carbon atoms or more may be considered hydrophilic alkylene oxides since the second oxygen in the molecule renders the polymer water-soluble. Therefore, a hydrophobic oxide in the broad sense is one in which the atomic ratio of carbon to oxygen is 2.5 or greater.

The copolymers of this invention include random and block copolymers of hydrophobic oxides or hydrophobic oxides in conjunction with ethylene oxide and/or other hydrophilic oxides. Thus, the copolymers may be di-, ter- or higher copolymers containing one or more hydrophobic oxides in conjunction with ethylene oxide and/or other hydrophilic oxides.

By an ultra-high molecular weight "hydrophobic" polyalkylene oxide polymer, we mean a substantially water insoluble, organic solvent soluble polymer. In general, we prefer that they be soluble in such solvents as aromatics, ketones, alcohols, etc. or mixtures thereof.

These polymers employed in the treatment of oil field emulsions are used as such, or are preferably diluted with any suitable solvent, for example, aromatic solvents, such as benzene, toluene, xylene, tar acid oil, sulfur dioxide extract obtained in the refining of petroleum, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., are often employed as diluents miscellaneous solvents, such as pine oil, acetone, carbon tetrachloride, etc., can also be employed as diluents. Similarly, the material or materials employed as the demulsifying agent of our process are often admixed with a mixture of the above solvents or other solvents customarily used in connection with the conventional demulsifying agents. The compositions of this invention may be used alone or in admixture with other suitable demulsifying agents.

The ultra high molecular weight polymers of this invention can be employed in solution, in suspension in such solvents as water, etc., in solid form such as in the form of sticks, pellets, chunks, etc., either alone or as a cosolvent solid such as in a solid solution in naphthalene and the like, etc. These sticks may be employed downhole. Since the compositions of this invention are frequently used in a ratio of 1 to 10,000, or 1 to 20,000, or 1 to 30,000, or even 1 to 40,000, or 1 to 50,000, as in desalting practice, an apparent insolubility in oil is not significant, because said compositions undoubtedly have some solubility within such concentrations.

In practicing our process for resolving petroleum emulsions of the water-in-oil type, a treaty agent or demulsifying agent of the kind herein described is brought into contact with or caused to act upon the emulsion to be treated, in any of the various apparatus now generally used to resolve or break petroleum emulsions with a chemical reagent, the above procedure being used alone or in combination with other demulsifying procedures, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e.g., the bottom of the tank, and reintroduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily, the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, gas separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the desirable water content of the emulsion separates and settles from the mass.

The following is a typical installation:

A reservoir to hold the demulsifier of this invention is placed at the well-head where the effluent liquids leave the well. This reservoir or container, which may vary from about a gallon to 50 gallons or more for convenience, is connected to a proportioning pump which injects the demulsifier dropwise into the fluids leaving the well. Such chemicalized fluids pass through the flow line into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do no disturb stratification which takes place during the course of demulsification. The settling tank has two outlets, one being below the water level to drain off the water resulting from demulsification or accompanying the emulsion as free water, the other being an outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:10,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:20,000, 1:50,000, or the like. However, with extremely difficult emulsions higher concentrations of demulsifier can be employed.

The ultra-high molecular weight polymers of this invention can be employed alone, in solution or in conjunction with other chemical demulsifiers.

In recent years pipeline standards for oil have been raised so that an effective demulsifier must not only be able to break oil field emulsions under conventional conditions without sludge, but at the same time it must also yield bright pipeline oil, i.e., pipeline oil that is free from the minute traces of foreign matter, whether suspended water or suspended emulsion droplets due to non-resolvable solids. In addition the water phase should be free of oil so as not to create a disposal problem. Thus it is presently desirable to use a demulsifier that produces absolutely bright, haze-free oil in the top layer, yields little or no interphasial sludge, and has little if any oil in the water phase.

The following demulsification examples are presented for purposes of illustration and not of limitation.

EXAMPLES

The ultra-high molecular weight polyoxyalkyleneglycols of this invention are superior reagents for resolving water-in-oil emulsions. The method employed for evaluating these materials is the "Bottle Test" described in "Treating Oil Field Emulsions," second edition, issued by Petroleum Extension Service and the Texas Education Agency in cooperation with the American Petroleum Institute, 1955 (revised 1962), pages 39–44.

The effectiveness of the present demulsifiers is based on their ability to resolve oil field emulsion with a minimum amount of reagent to yield bright oil that is essentially free of water and unresolved emulsion and meets pipeline specification (normally less than 1% BS & W). Of particular advantage is the ability of the present demulsifiers to break petroleum emulsions very rapidly in comparison with conventional demulsifiers.

An emulsion was taken from the Little Buffalo Basin, Wyoming (Pan American Petroleum Corporation, Tensleep #42 lease, well #12) containing 34% water. The demulsifier was added as a 1% solution to 100 ml. of the warmed emulsion (160° F.). It was shaken for four minutes (196 shakes/min.) and then allowed to quitely settle for four hours. The resultant top oil was then analyzed for water.

Several products of this invention were compared to the commercial compound presently in use on this emulsion and to the product of Example No. 20 which serves as another control. The product of Example No. 30 represents one of the best compounds made according to S.N. 570,753. As can be noted from the following Table 6, by the use of nitrobenzene in the catalyst system a significant lowering of molecular weight is achieved with little or no sacrifice in demulsification ability. This same trend is noted with the homopolymers. However, as a group they are relatively less effective than the copolymers. It should be noted that lowering of molecular weight by use of lesser amounts of acetyl acetone as taught in S.N. 570,753 (product of Example 51) gives a less effective demulsifier as compared to products made according to the process of this invention.

TABLE 6

| Product of Example | Ml. of 1% soln. | Percent water in treated oil |
|---|---|---|
| Best commercial cpd. in use | 2.0 | 0.6 |
| Do | 1.5 | 1.2 |
| Do | 1.0 | 7.6 |
| 17 (polymerized with nitro cpd.) | 2.0 | 0.8 |
| Do | 1.5 | 0.7 |
| Do | 1.0 | 1.5 |
| 20 (polymerized without nitro cpd.) | 2.0 | 0.4 |
| Do | 1.5 | 0.5 |
| Do | 1.0 | 0.7 |
| 4 (polymerized with nitro cpd.) | 1.4 | 2.0 |
| 5 (polymerized with nitro cpd.) | 1.4 | 1.7 |
| 11 (polymerized with nitro cpd.) | 1.4 | 2.0 |
| 12 (polymerized with nitro cpd.) | 1.4 | 2.0 |
| 13 (polymerized with nitro cpd.) | 1.4 | 1.5 |
| 14 (no nitro compound) | 1.4 | 1.6 |
| 33 (polymerized with nitro cpd.) | 1.4 | 1.7 |
| 36 (polymerized with nitro cpd.) | 1.4 | 1.8 |
| 51 (no nitro compound) | 1.4 | 5.0 |

Another emulsion used for testing was taken from the Manvel field located near the Texas Gulf Coast, (producer Texaco, lease W. T. Belcher A, well No. 30, producing zone Upper Miocene B) having an API gravity of 24 and containing 50% water. The demulsifier was added as a 1% solution to 100 ml. of the emulsion at ambient temperature. It was hand shaken 150 times and then allowed to quitely settle. The resultant oil was then analyzed for water. Results are shown in the following Table 7.

TABLE 7

| Product of Example | Ml of 1% solution | Percent water in treated oil after 3 hours | Percent water in treated oil after 18 hours |
|---|---|---|---|
| Commercial cpd. in use | .5 | 2.0 | 0.6 |
| 4 (Nitro Compound) | .5 | 1.6 | 0.6 [1] |
| 6 (Nitro Compound) | .5 | 1.8 | 0.7 |
| 8 (Nitro Compound) | 1.6 | 0.6 | -- |
| 10 (Nitro Compound) | 1.6 | 0.7 | -- |
| 12 (Nitro Compound) | 1.6 | 1.2 | 0.7 |
| 14 (No nitro compound) | 1.6 | 0.9 | 1 0.5 |
| 15 (Nitro compound) | 1.6 | 1.2 | 0.5 |
| 16 (No nitro compound) | 1.6 | 0.7 | 2 0.4 |
| 17 (Nitro compound) | 1.6 | 0.8 | 0.4 [40] |
| 18 (Nitro compound) | 1.6 | 0.8 | 0.2 |
| 19 (Nitro compound) | 1.6 | 1.0 | 0.3 |
| 20 (Nitro compound) | 1.6 | 0.8 | 3 0.4 |
| 33 (Nitro compound) | 1.6 | 0.8 | 0.3 |
| 36 (Nitro compound) | 1.6 | 0.8 | 0.4 |
| 37 (Nitro compound) | 1.6 | 1.0 | 0.3 |
| 44 (Nitro compound) | 1.6 | 1.2 | 0.4 |

[1] Control for Ex. Nos. 4,6,8,10,12,36,37.
[2] Control for Ex. No. 15.
[3] Control for Ex. No. 17,18,19.

As previously noted these high molecular weight polyoxyalkyleneglycols are unusually good demulsifiers. As shown in Table 7 they are superior to the commercial compound in use. The table also shows that little or no activity is lost by using a catalyst solution containing nitrobenzene as a component. The advantage of the products of this invention is that this good activity is maintained with greatly improved solution viscosity characteristics gained through a lowering of molecular weight.

One of the difficulties experienced in using the oxirane polymers prepared in accord with S.N. 570,753 is the problem of handling the high viscosity polymer solutions prepared in accord with said patent application.

However, the nitro compounds of the present invention control the average molecular weight and molecular weight distribution and yield solutions of lower viscosity but also have similar effectiveness. Stated another way, the polymeric oxiranes made according to this invention are as effective as nonnitro polymerized oxiranes, but because of their lower viscosity, due to lower molecular weight and molecular weight distribution (i.e., more monodisperse), the same amount of polymer can be more expeditiously handled as a less viscous solution.

In view of the highly viscous solutions that low concentrations of oxirane polymer generally yield, lower viscosity for the same activity is a very important consideration. It is so important that it makes the difference between a commercially acceptable and noncommercially acceptable product.

USE AS OIL-IN-WATER DEMULSIFIERS

In U.S. Pat. 2,964,478 there is described and claimed the use of ultra-high molecular weight polyalkylene oxides in the demulsification of oil-in-water emulsions.

Hydrophilic polyalkylene oxides of the present invention can be similarly employed. Thus, hydrophilic or water soluble polyalkylene oxides, both homo- and copolymers, such as homo- polymeric ethylene oxides and copolymeric ethylene, propylene, butylene oxides, etc., can be employed in oil-in-water demulsification. By hydrophilic or water soluble is meant that the polymer is sufficiently soluble or dispersible in the aqueous system in which it is employed to be effective. For example, at least about 1% soluble in water but usually better than 5% soluble and preferably greater than 20% soluble. Of course solution viscosities will limit the total amounts of material which can be easily handled in more concentrated solutions.

Preferable examples include polymers of ethylene oxide and copolymers of ethylene oxide and hydrophobic oxide such as those described above, for example, propylene oxide, butylene oxide, etc.

By employing the catalysts of the present system one can more accurately regulate both the molecular weight and molecular weight distribution so as to custom design the polymer to the particular emulsion system. Thus, one has the advantage of employing a less viscous polymeric solution and more monodisperse polymer.

EXAMPLES

The following copolymers prepared in the manner described in "General Procedure" illustrate the general types of these materials which are effective oil-in-water demulsifiers prepared according to this present invention:

Ex. 1A—95 mole percent EtO and 5 mole percent PrO.

Ex. 2A—85 mole percent EtO and 15 mole percent PrO.

Ex. 3A—90 mole percent EtO and 10 mole percent 1,2-BuO.

Ex. 4A—95 mole percent EtO and 5 mole percent cyclohexene oxide.

Ex. 5A—95 mole percent EtO and 5 mole percent phenylglycidyl ether.

Ex. 6A—95 mole percent EtO and 5 mole styrene oxide.

The above polymers are employed in the manner described in the above U.S. Pat. 2,964,478 to treat oil-in-water emulsions.

OTHER USES

Because of their demulsification properties, the compounds of our invention are also useful in preventing the formation of emulsions such as occurs for example during transit or storage. Oil may pick up extraneous water during transit through pipelines, storage in tanks and during transportation in sea-going tankers, and the like. This oil may be dehydrated crude or may be refined products such as lube oil, kerosene, fuel oil or the like.

The polymers of our invention may also be used to prevent emulsification during acidizing.

They may also be used to treat down hole before the emulsion is formed. For example, the products of this invention may be made as a solid solution in naphthalene in convenient sized pellets and then used down hole. By adjustment of the amount of naphthalene (or other components), a controlled rate of dissolution in the crude oil may be achieved. Particles of demulsifier of controlled size may also be injected into the formation in water flooding, in hydrofracing, etc.

The products of this invention may also be of value as thickening agents for hydrocarbon systems. For example, in one form of oil well fracturing, a gelled hydrocarbon is injected into the oil bearing formation under pressure to fracture it and facilitate the production of crude oil.

These products are most valuable when blended with wax, for example, microcrystalline and/or paraffin wax. In this respect they serve two purposes. First, they increase the viscosity of wax blends and thus minimize the absorption of wax in the paper when used for lamination. Less wax can then be used, or thicker layers of wax can be placed between the sheets of paper, metal foil or plastic sheets. A better moisture vapor barrier is therefore formed. Secondly, the ultra-high molecular weight polyalkylene glycols of this invention greatly enhance the laminating strength of microcrystalline and/or paraffin blends (other additives may also advantageously be employed). This is believed due to increased cohesive and adhesive strengths.

Having thus described our invention what we claim as new and desire to obtain by Letters Patent is:

1. A process of preparing an ultra high molecular weight oxirane polymer which comprises contacting an oxirane component consisting of oxirane compounds without any aliphatic unsaturation and having a single vicinal epoxy group with a catalyst system comprising
   (1) an organo-aluminum compound selected from the group consisting of trialkylaluminum compounds and dialkylaluminum hydrides and
   (2) a nitro compound selected from the group consisting of nitro substituted aliphatic hydrocarbon compounds and nitro substituted aromatic hydrocarbon compounds.

2. The process of claim 1 wherein (1) is an organo-aluminum compound selected from the group consisting of trialkylaluminum compounds and dialkylaluminum hydrides employed in conjunction with (i) an organic chelating agent compound capable of forming a ring by coordination with its unshared electrons and the aluminum atom and (ii) water and (2) is a nitro substituted aromatic hydrocarbon compound.

3. The process of claim 2 wherein the molar ratios of said organo-aluminum compound to chelating agent and water are from about 0.1 to about 1.5, and the molar ratio of said nitro aromatic hydrocarbon compound to aluminum is at least about 0.01.

4. The process of claim 3 wherein said organo-aluminum compound is a trialkylaluminum compound, said chelating agent is acetylacetone and said nitro aromatic hydrocarbon compound is nitrobenzene.

5. An ultra high molecular weight oxirane polymer produced by contacting an oxirane component consisting of oxirane compounds without any aliphatic unsaturation and having a single vicinal epoxy group with a catalyst system comprising (1) an organo-aluminum compound selected from the group consisting of trialkylaluminum compounds and dialkylaluminum hydrides and (2) a nitro compound selected from the group consisting of nitro substituted aliphatic hydrocarbon compounds and nitro substituted aromatic compounds, said product being more mono-disperse and less viscous in solution than the corresponding product produced without the presence of said nitro compound.

6. The ultra high molecular weight oxirane polymer product of claim 5 wherein (1) is an organo-aluminum compound selected from the group consisting of trialkylaluminum compounds and dialkylaluminum hydrides employed in conjunction with (i) an organic chelating agent compound capable of forming a ring by coordination with its unshared electrons and the aluminum atom and (ii) water and (2) is a nitro substituted aromatic hydrocarbon compound.

7. The ultra high molecular weight oxirane polymer product of claim 6 wherein the molar ratios of said organo-aluminum compound to chelating agent and water are from about 0.1 to about 1.5, and the molar ratio of said nitro aromatic hydrocarbon compound to aluminum is at least about 0.01.

8. The ultra high molecular weight oxirane polymer product of claim 7 wherein said organo-aluminum compound is a trialkylaluminum compound, said chelating agent is acetylacetone and said nitro aromatic hydrocarbon compound is nitrobenzene.

References Cited

UNITED STATES PATENTS

| | | | |
|---|---|---|---|
| 3,135,705 | 6/1964 | Vandenberg | 260—2 |
| 3,135,706 | 6/1964 | Vandenberg | 260—2 |
| 3,158,581 | 11/1964 | Vandenberg | 260—2 |
| 3,285,861 | 11/1966 | Vandenberg | 260—2 |
| 3,301,796 | 1/1967 | Herold | 260—2 |
| 3,396,125 | 8/1968 | Wofford | 260—2 |

WILLIAM H. SHORT, Primary Examiner

E. A. NEILSEN, Assistant Examiner

U.S. Cl. X.R.

252—358, 431; 260—47